A. R. BLOOD & B. UHRICH.
Improvement in Grain Drills.
No. 122,986.            Patented Jan. 23, 1872.
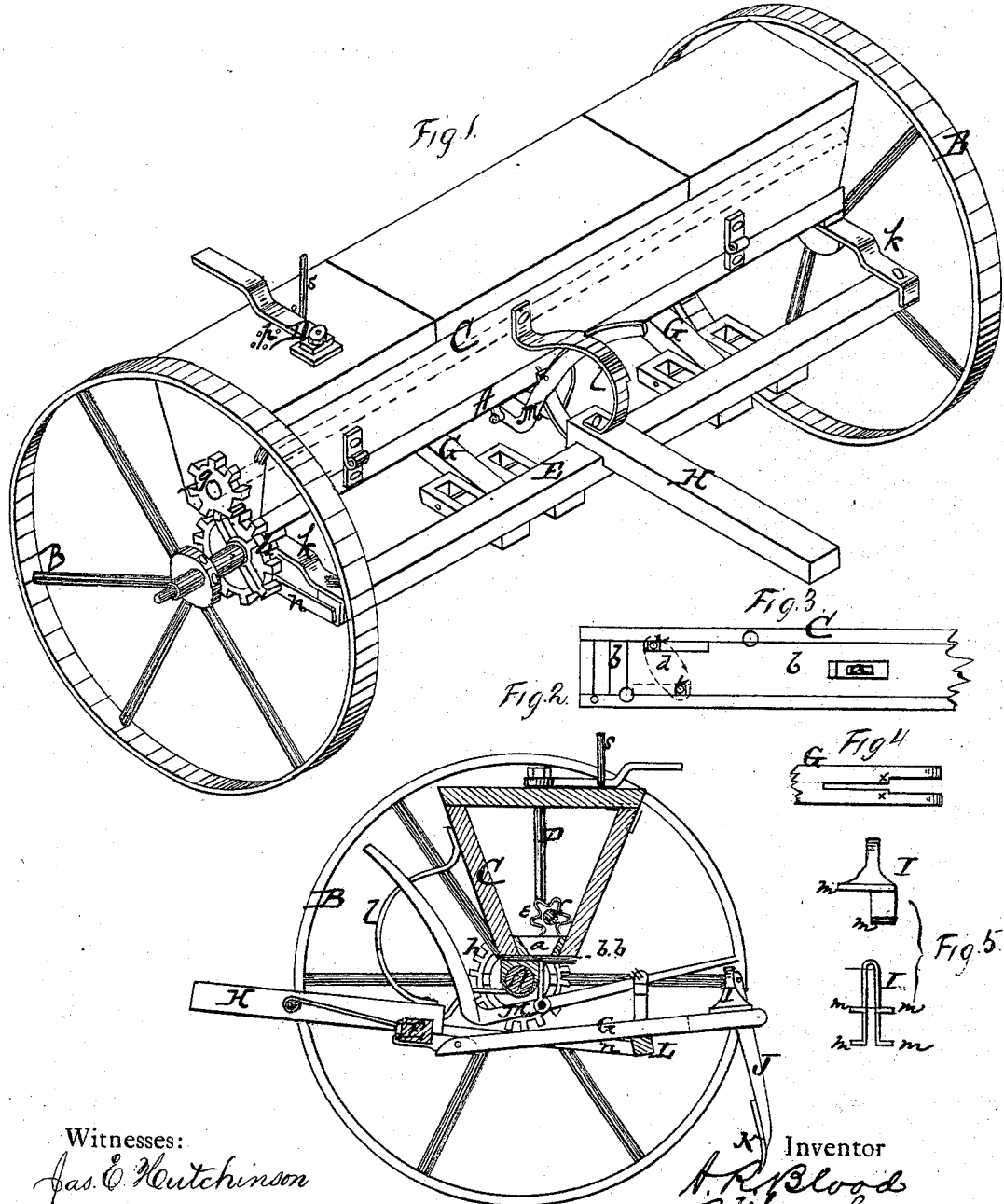

UNITED STATES PATENT OFFICE.

AMOS RAY BLOOD AND BENJAMIN UHRICH, OF INDEPENDENCE, IOWA.

IMPROVEMENT IN GRAIN-DRILLS.

Specification forming part of Letters Patent No. 122,986, dated January 23, 1872.

*To all whom it may concern:*

Be it known that we, AMOS RAY BLOOD and BENJAMIN UHRICH, of Independence, in the county of Buchanan and in the State of Iowa, have invented certain new and useful Improvements in Combined Seed-Sower and Cultivator; and do hereby declare that the following is a full, clear, and exact description thereof, reference being had to the accompanying drawing and to the letters of reference marked thereon making a part of this specification.

The nature of our invention consists in the construction and arrangement of a "combined seed-sower and cultivator," as will be hereinafter more fully set forth.

In order to enable others skilled in the art to which our invention appertains to make and use the same, we will now proceed to describe its construction and operation, referring to the annexed drawing, in which—

Figure 1 is a perspective view, and Fig. 2 is a transverse vertical section of our machine. Fig. 3 is a bottom view of one end of the seed-box. Fig. 4 is a plan view of the outer end of the plow-beams, and Fig. 5 shows a slide to be inserted in the same.

A represents the axle, on the ends of which the wheels B B are placed, and on top of which the seed-box C is firmly secured. The bottom of the seed-box C is provided with a series of hopper or funnel-shaped apertures, a a, through which the seed passes down into the ground. Under the bottom are placed two sliding plates, b b, provided with holes or apertures corresponding with the apertures a a in the bottom of the box. These slides are operated by means of a lever, D, which passes through the top of the seed-box of the slides and has a cross-piece, d, of iron on its lower end. This cross-piece has at each end, on the under side, a pin, i, which passes through a hole in one slide and a slot in the other, as shown in Fig. 3.

When the lever D is moved the slides work in opposite directions, whereby the center of the hole in said slides, whether large or small, through which the grain passes, is kept square under the arm or other device that scatters the grain.

e is a wheel placed over the aperture in the bottom of the box, on a shaft, f, to agitate the seed. This shaft passes longitudinally through the box C, and has one of said wheels, e, over each aperture a. Upon one end of the shaft f is a pinion, g, gearing with a cog-wheel, h, upon the axle A, by means of which the shaft and agitators are rotated. E represents a bar running parallel with, but in front of and below, the axle, and attached to the same by metal straps k k at the ends. To the center of this bar the tongue H is firmly attached and braced to the seed-box C by a curved brace, l. Between suitable ears or projections on the rear side of the bar A are pivoted arms or beams G G, the rear ends of which are slotted or forked, as shown in Fig. 4. It will be noticed that this slot is wider at the outer end than at the inner, shoulders x x being formed at a suitable point. In this slot is inserted a cut-off, I, constructed, as shown in Fig. 5, with flanges m m to fit above and below the arm. This cut-off is moved up to and against the shoulders x x, and in the same is pivoted the shank J, which carries the shovel K at its lower end. Through the upper end of the shank J is passed a wooden pin, which in plowing bears against the cut-off I, and when the shovels strike any hard substance the "cut-off" cuts off said wooden pin, preventing any injury to any other part of the machine. The arms G G rest upon a bar, L, connected by means of pivoted rods n n with the ends of the bar E. The bar L is raised and lowered by means of a lever, M, pivoted to arms extending from the axle and having one end in front and the other in rear of the seed-box, the rear end being connected with the bar L. By this means the operator can, whether riding or walking behind, raise the shovels out of the ground, and they are held by the front end of the lever M catching on notches in the curved brace l.

The machine can be used for plowing corn, when small, by taking off the box and attaching a seat.

In sowing the amount of grain sown is regulated by the size of the apertures formed by the two slides b b, and this may be indicated on top of the box by a plate, p, attached to the same, said plate having a series of holes, in either one of which a pin, *s*, may be inserted, and the lever D come up against the pin.

Having thus fully described our invention, what we claim as new, and desire to secure by Letters Patent, is—

1. The plate *d* with pins *i i*, standard and lever D, in combination with the slides *b b* operated in opposite directions, substantially as and for the purposes set forth.

2. The drag-bars G, in combination with the lever M arranged to be operated either from the front or rear of the machine, substantially as and for the purpose set forth.

In testimony that we claim the foregoing we have hereunto set our hands this 12th day of September, 1871.

A. R. BLOOD.
B. UHRICH.

Witnesses:
  H. C. CURTIS,
  GEORGE KINT.